United States Patent [19]
Szabo et al.

[11] Patent Number: 5,263,066
[45] Date of Patent: Nov. 16, 1993

[54] NUCLEAR REACTOR EQUIPPED WITH A CORE CATCHER

[75] Inventors: Imré Szabo, Venelles; Francois Balard, Manosque; Yves Bergamaschi, Aix-en-Provence; Gian L. Fiorini, Villelaure; Jean Geffroy, Versailles; Jean-Marie Seiler, Seyssins, all of France

[73] Assignee: Commissariat a l'Energie Atomique, France

[21] Appl. No.: 963,601

[22] Filed: Oct. 20, 1992

[30] Foreign Application Priority Data

Nov. 6, 1991 [FR] France ............................ 91 13689

[51] Int. Cl.$^5$ .............................................. G21C 9/016
[52] U.S. Cl. .................................................... 376/280
[58] Field of Search ............... 376/280; 976/DIG. 143

[56] References Cited

U.S. PATENT DOCUMENTS

| | | | |
|---|---|---|---|
| 4,045,284 | 8/1977 | Rosewell | 376/280 |
| 4,072,561 | 2/1978 | Friedrich | 376/280 |
| 4,146,429 | 3/1979 | Slagley | 376/280 |
| 4,442,065 | 4/1984 | Latter et al. | 376/280 |

FOREIGN PATENT DOCUMENTS

2459339 7/1976 Fed. Rep. of Germany .
3711480 1/1988 Fed. Rep. of Germany .
85/00921 2/1985 PCT Int'l Appl. .

Primary Examiner—Daniel D. Wasil
Attorney, Agent, or Firm—Pearne, Gordon, McCoy & Granger

[57] ABSTRACT

In order to ensure the recovery and confinement of the core of a nuclear reactor, such as a pressurized water reactor, in the case of a serious accident leading to its melting or meltdown, it is proposed that below the reactor vessel (16) be placed a receptacle (20) able to evacuate the water accumulated below the vessel (16) in the initial phase of the accident and then collect the molten core debris. The water automatically flows through overflow and siphon devices (46, 50) into a cooling space (40) located below the receptacle. If the meltdown of the core (18) has been detected, the water contained in tanks (56) flows by gravity into the space (40), so as to entirely immerse the containers (26) placed in said space. The molten core traversing the bottom of the vessel (16) flows into the receptacle (20) and then into containers (26) via meltable plugs (32) and a natural convection flow is established between the tanks (56) and the space (40) in order to ensure cooling. Fall absorbers or dampers (76) are placed in the receptacle (20) for the case where the bottom of the vessel (16) drops in a single block.

27 Claims, 10 Drawing Sheets

NUCLEAR REACTOR EQUIPPED WITH A CORE CATCHER

DESCRIPTION

The invention relates to a light water reactor, such as a pressurized water reactor, equipped with a device for collecting solid or liquid debris from the reactor core and for the confinement thereof in a location provided for this purpose so as to prevent them penetrating the ground. Such a device is known as a core catcher.

For the satisfactory understanding of the invention the example of a pressurized water reactor is used. It is pointed out that in such a nuclear installation, the reactor core is generally placed in a vessel forming part of a primary circuit in which circulates the pressurized water and which is moved by pumps. The forced convection water is used for extracting the energy produced by the nuclear fission processes in the core and cools the fuel elements contained therein. The energy, transported by the water and transferred to the secondary of steam generators, produces steam there, which is then fed into a turbine coupled to an alternator in order to generate electricity. The regulation and setting of the pressure of the fluid in the primary circuit take place by means of a pressurizer, equipped with one or more discharge valve means, which can be opened or closed automatically or manually in order to lower, if appropriate, the primary pressure in accordance with procedures serving to control certain well identified accidents or incidents.

The complete primary circuit is enclosed in a confinement enclosure, whose base, known as a raft foundation is made from concrete. The most important components such as the pumps and steam generators are distributed in different compartments of the enclosure known as casemates. The reactor vessel is also located in a compartment known as the "vessel well".

It is pointed out that despite the very limited probability of its occurrence, a serious accident, i.e. leading to core meltdown, cannot be completely excluded. Such an accident is conceivable if all the circuits cooling the core, including the standby circuits, failed simultaneously over a long period. In this highly improbable case, the reactor core would melt within a few hours. The melting would take place initially at the hottest points of the core and would then spread and its preferred direction of advance would be that of the force of gravity.

The molten mass increases with time for as long as there are no means for completely evacuating the residual power of the core. It generally contains the fuel, the materials constituting its canning, those of the reactor control rods and structures within the vessel. The path of this molten mass known as "corium", within the vessel is dependent on numerous parameters and phenomena, whereof some are of a very high energy level such as the oxidation of the zirconium (Zr) of the cans, or which may be very violent such as the interaction between the molten corium and the water, which can give rise to so-called "vapour explosions". However, it is considered that the latter is very unlikely.

In general, the molten mass would reach the bottom of the vessel. The barrier effect of the latter with respect to the molten corium is very limited, particularly if it drops in the form of continuous jets. The vessel bottom, which is not generally cooled, would then be rapidly perforated and, as a function of the pressure existing in the vessel at this particular time, the corium would be ejected with varying violence levels into the vessel well located in the confinement enclosure.

The existence of a high pressure in the vessel at the time of its fracture could lead to an atomization of the molten corium into the form of very fine particles, which could transfer very rapidly and very effectively a significant part of their energy to the atmosphere of the enclosure. The "direct" heating of this atmosphere would increase the pressure in the enclosure and could lead to the fracture of the latter. To avoid this violent phenomenon, use is made of an "automatic depressurization system" of discharge valves in order to preventatively lower the pressure of the primary circuit to a sufficiently low value for the risk of corium atomization to be negligible. Apart from the pressurizer discharge valves, this system can incorporate other groups of valves connected at chosen locations of the primary circuit, so as to ensure an adequate discharge capacity and a depressurization dynamic without any risk for the primary circuit.

Following the perforation of the bottom of the reactor vessel, the molten mass would drop onto the concrete raft foundation of the vessel well. Its composition and physical properties would depend on its path within the vessel (dissolved or undissolved materials transported in the corium flow, temperature, more or less viscous state, etc.), i.e. the accident scenario.

In the highly pessimistic hypothesis of a complete meltdown of the core and all the internal structures of the vessel located in its immediate vicinity, roughly two hours following the start of the accident, the corium would be formed, in the case of a reactor with a nominal power (electrical power) of 1300 to 1400 MWe, by approximately 75 tonnes of steel, 120 tonnes of $UO_2$ and 28 tonnes of Zr and the residual reactor power, which would remain stored within the fuel oxides, would be approximately 40 MWth (thermal power), which would decrease as a function of time. It should also be noted that part of the zirconium would be oxidized to zirconium dioxide $ZrO_2$ and that the remaining metallic part would present a significant potential danger (highly exothermic oxidation reaction with hydrogen production). Other materials would also be present in smaller quantities, i.e. silver-indium-cadmium (AIC) of the absorbing bars, the Inconel (registered trademark) of the grids and gratings, etc.

The mass of more than 200 tonnes of corium would flow into the bottom of the vessel well in different ways and at variable speeds as a function of the size and location of the breach made in the vessel by the molten corium. If the vessel bottom was perforated by corium jets, the latter would continue to descend towards the bottom of the vessel well through the initial breach, whose diameter would increase as its edges melted under the action of the jet.

However, under certain conditions, the bottom of the reactor vessel could offer an adequate resistance to be able to temporarily stop the molten corium mass, which could possibly totally fill the volume of the hemispherical cap. The internal natural convection of the molten corium bath retained in this way on the bottom of the vessel could give rise to hot points in the top part of the bath and lead to a "circumferential" flow in the vicinity of the free level of the bath. This corium-filled spherical cap would then be detached from the vessel in a single block.

As there is generally a certain quantity of water in the vessel well, the dropping or fall of the corium in the form of jets which can fragment on contact with said water, or that of the entire cap filled with molten corium, could give rise to more or less violent "vapour explosions".

Finally, the molten mass would reach the bottom of the vessel well where it would attack the concrete of the raft and would decompose the latter, producing a quantity of aerosols, fuel gases ($H_2$, $CO$) or incondensable gases ($CO_2$) and thus release into the atmosphere radioactive products previously trapped within the molten corium. This production of aerosols and gases would lead to an increase in the pressure of the confinement enclosure. Moreover, the action of the corium would also lead to a dissolving of the concrete structures, so that the water available in the bottom part of the enclosure could come into direct or indirect contact in order to evaporate and further raise the enclosure pressure.

After a few days, the interaction between the corium and the concrete of the raft foundation would lead to very significant risks of radioactive products being discharged into the environment. On the one hand, the fracture limit of the confinement enclosure could be exceeded by the pressure rise induced by this interaction. On the other hand, the surface of the vessel well of existing reactors is relatively small (approximately 30 $m^2$) and the thickness of the corium too great for its power to be evacuated by radiation on the surface of the corium and by conduction through the concrete. It would be necessary to have a spreading surface of more than 150 $m^2$ to reach a thickness below 20 cm, which would make the corium coolable. Thus, despite its thickness (approximately 4 m in existing pressurized water reactors), the raft foundation would be inexorably traversed and the corium would enter the subsoil and would contaminate the ground water. The consequences are obviously very serious.

Bearing in mind the risks of the discharge of radioactive substances into the environment during serious accidents with reactor core meltdown, it is necessary to design means for limiting the consequences thereof, particularly a means for confining and cooling the corium before it attacks the concrete of the raft foundation and enters the subsoil, thus opposing subsoil contamination and the discharge of radioactive products into the environment by the route opened by the passage through the raft foundation.

The different devices proposed up to now have been designed on the basis of much earlier-dated knowledge concerning serious accidents and consequently of a less exhaustive nature than the description given hereinbefore, which casts doubts on their effectiveness in certain situations, which were not taken into account at the time of their design. Reference can e.g. be made to the possibility of expelling pressurized corium or corium in the form of powerful jets, the sudden dropping of virtually all the corium mass as a result of the detachment by flow of the hemispherical bottom of the vessel, vapour explosions and in general terms all the violent phenomena which could destroy the catcher means, which are not dimensioned to withstand such loads.

In certain catcher means, it is considered that all the corium is naturally located at the bottom of the vessel well without there being any need to collect it to move it to the location where its confinement and cooling are ensured.

Other devices make it necessary for the molten corium to cover very long distances through all the tubes in which are located meltable plugs permitting a programmed filling of the tubes. However, the "programming" of these meltable tubes remains arbitrary due to uncertainties concerning the corium flow phenomena and its physical properties.

Other devices make use of consumable endothermic materials (or sacrificial layer) with a view to damping the thermal shocks, but without being able to take account of the possible consequences of the interaction of the corium with said sacrificial layer.

Finally, certain devices use large planar surfaces for the spreading of the corium and for the better cooling thereof. The homogeneity of the spreading and that of the cooling, which are absolutely necessary for confining the corium, would not appear to be guaranteed for such large surfaces.

The present invention specifically relates to a nuclear reactor equipped with a core catcher, whose design takes account of all the violent phenomena which may occur during a serious accident leading to reactor core meltdown, in order to limit to the maximum possible extent the consequences of such an accident, whilst in particular opposing subsoil contamination.

In the broadest definition of the invention, this result is obtained by means of a nuclear reactor having a confinement enclosure, a primary circuit totally enclosed within said enclosure and containing pressurized water, said primary circuit having a vessel in which is placed a core, and means for the recovery of the core in the case of its meltdown, characterized in that the core recovery means comprise a receptacle surrounding at least a lower part of the vessel, containers placed below the receptacle and separated from the latter by meltable plugs, a cooling space surrounding the containers, means for the passive emptying of the receptacle into the cooling space, at least one cooling water storage tank located at a level above that of the cooling space and means for establishing a natural convection flow between the tank and the cooling space.

If a primary coolant loss accident occurs, the depressurization means automatically bring the primary circuit to a low pressure and the water of the primary circuit is spread in the confinement enclosure. Part of the said water enters the receptacle placed beneath the vessel, the remainder being drained into tanks placed in the lower part of the enclosure. The automatic emptying of said receptacle into the cooling space is then ensured by passive emptying means, which advantageously comprise at least one overflow and at least one siphon.

If the core cooling can then be ensured by conventional means provided for this purpose in the reactor, the evolution of the accident is stopped. The reactor can then be brought back into an appropriate state, which presupposes the emptying of the cooling space by at least one drainage pipe, equipped with a normally closed isolating means and which advantageously issues into the bottom of said space.

However, if the core cooling cannot be ensured by the safeguarding means because the latter are unavailable or inadequate, the core starts to melt. This melting, which is detected by appropriate means, has the consequence of linking the tank or tanks with the cooling space, which fills with water and completely immerses the containers.

When the perforation of the vessel occurs under the effect of corium, the latter can drop into the then substantially water-drained receptacle and enters the containers, melting the meltable plugs. The heating of the water then present in the cooling space leads to the circulation of said water by natural convection between said space and the tank or tanks. The removal of the heat given off by the corium is then automatically ensured by passive means.

Preferably, the risks resulting from a sudden detachment of the bottom of the vessel are prevented by providing drop damping means in the receptacle and below the vessel.

In order to prevent any uncontrolled reaction of the corium with the walls of the receptacle and the containers, the latter are advantageously internally coated with at least one layer of a material which is refractory and chemically inert with respect to the materials forming the molten core, covered with a sealing skin.

Moreover, in order to improve the heat exchange between the corium contained in the contained in the containers and the water in the cooling space during a meltdown of the core, the containers can externally have heat exchange promoting means, such as ribs, blades or protuberances with a random shape.

To facilitate the cooling of the water entering the tank or tanks by natural convection from the cooling space surrounding the containers, it is advantageous to have heat discharge means in each tank and condensing means in the confinement enclosure. In the latter case, the interior of the enclosure communicates with each tank by at least one draining pipe.

As a function of the particular case, the containers can rest on the bottom of the cooling space by supports, or can be suspended on the bottom of the receptacle. In the first case, spacing grids are advantageously provided.

The invention is described in greater detail hereinafter relative to non-limitative embodiments and with reference to the attached drawings, wherein show.

Figure 1:
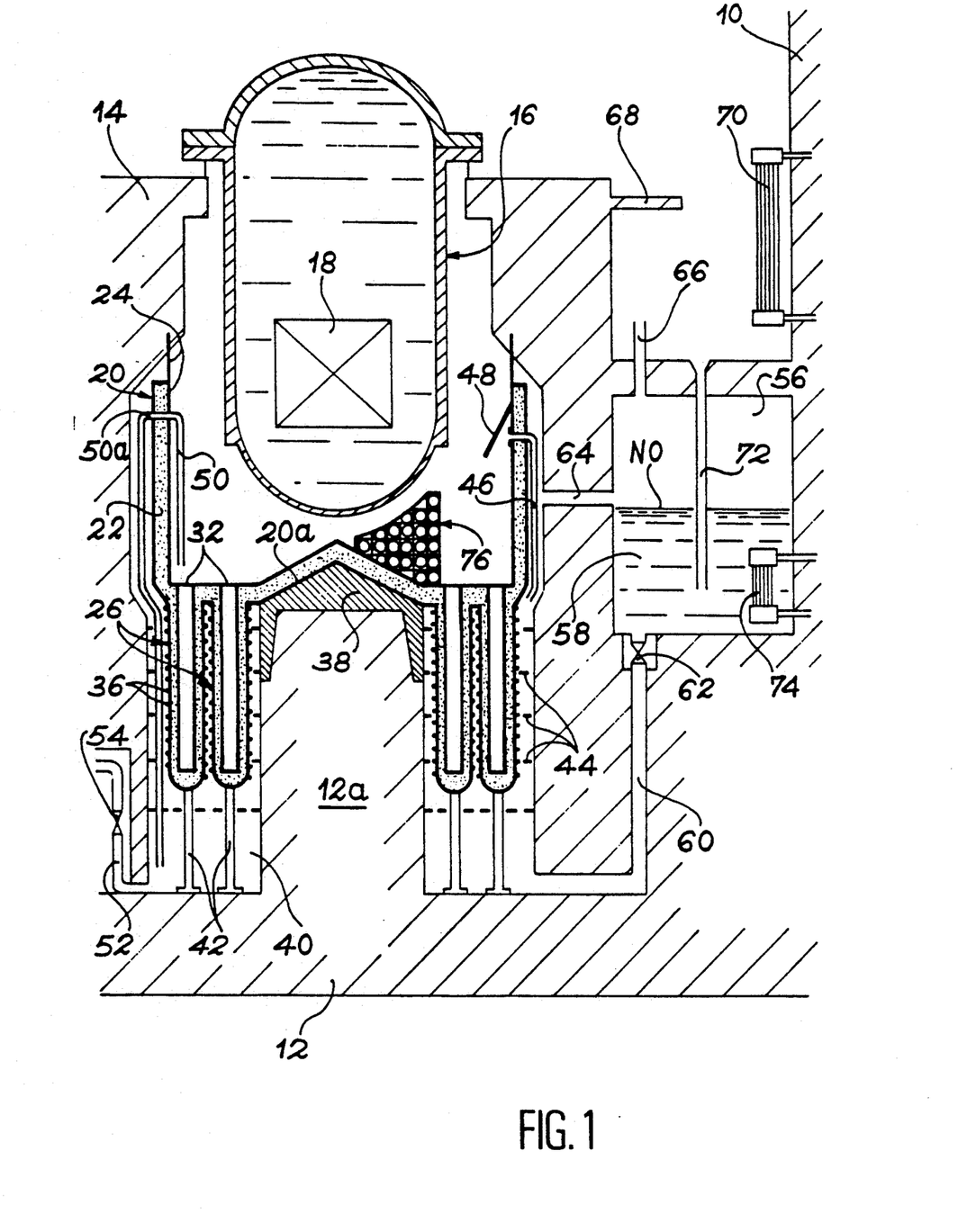
FIG. 1 A sectional view illustrating in diagrammatic manner a pressurized water nuclear reactor equipped with a core catcher according to the invention.

In FIG. 1, the reference 10 designates part of a confinement enclosure within which is totally enclosed the primary circuit of the nuclear reactor. FIG. 1 also shows the raft foundation 12 of the confinement enclosure 10, together with the vessel well 14 housing the vessel 16. However, the other components of the primary circuit such as the pumps, steam generators and pressurizer are not shown. This also applies with respect to the pipes connecting these components to one another and to the vessel 16, as well as the discharge valves associated with the depressurization system for permitting an automatic or manual lowering of the pressure prevailing in the primary circuit in the case of an accident.

In order to facilitate the understanding of the invention, FIG. 1 also very diagrammatically illustrates the reactor core 18 placed within the vessel 16. However, all the other components normally placed within said vessel, such as those making it possible to check the operation of the reactor under normal conditions and its stoppage in the case of an accident are not shown.

According to the invention, the nuclear reactor illustrated in FIG. 1 is equipped with core catching means, in the case of a meltdown of said core, which will now be described in greater detail.

These core catching means firstly comprise a receptacle 20, which surrounds the lower part of the vessel 16 up to a level close to the top of the core 18. This receptacle 20 is internally coated with several layers 22 made from one or more materials which are refractory and chemically inert with respect to the corium. The material or materials forming the layers 22 are designed so as to be able to withstand high temperatures and thermomechanical shocks associated with discharges and jets of corium, should the latter traverse the reactor vessel 16.

The inner surface of the layers 22 is coated with a metal sealing skin 24, whose integrity and consequently sealing function to be fulfilled by it cannot be retained for very long in the case of serious accidents. Thus, it would be rapidly destroyed at least in part by the corium when the latter enters the receptacle 20.

Figure 2:
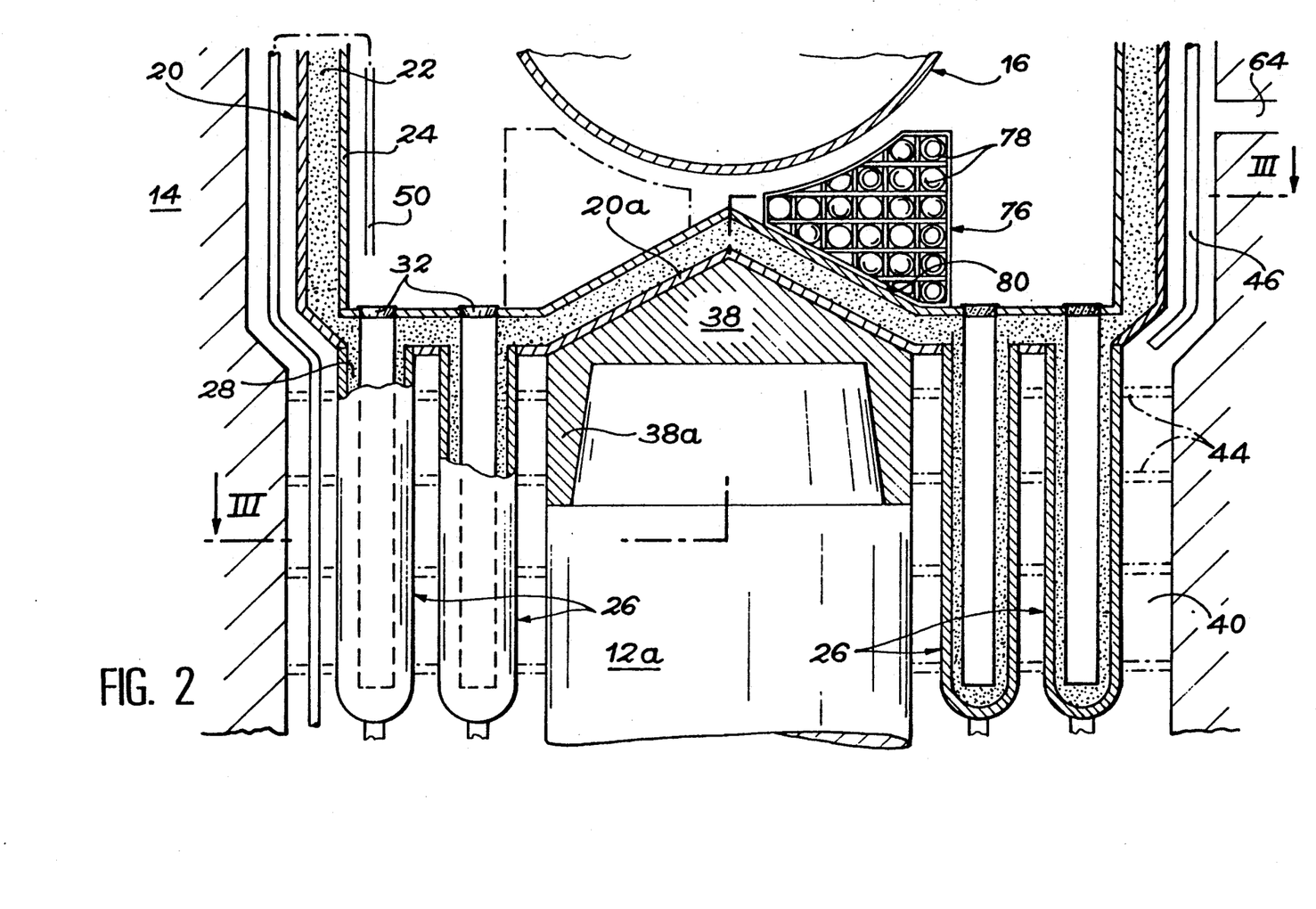
FIG. 2 A sectional view comparable to FIG. 1, illustrating on a larger scale that part of the core catcher positioned below the reactor vessel.

In the embodiment of the invention illustrated in FIGS. 1 and 2, the bottom of the receptacle 20 has a substantially planar, horizontal, peripheral part and a cone or pyramid-shaped central part 20a. The slope of the central part 20a is chosen in such a way that the corium which could drop into it is brought towards the peripheral part in as short a time as possible.

Figure 3:
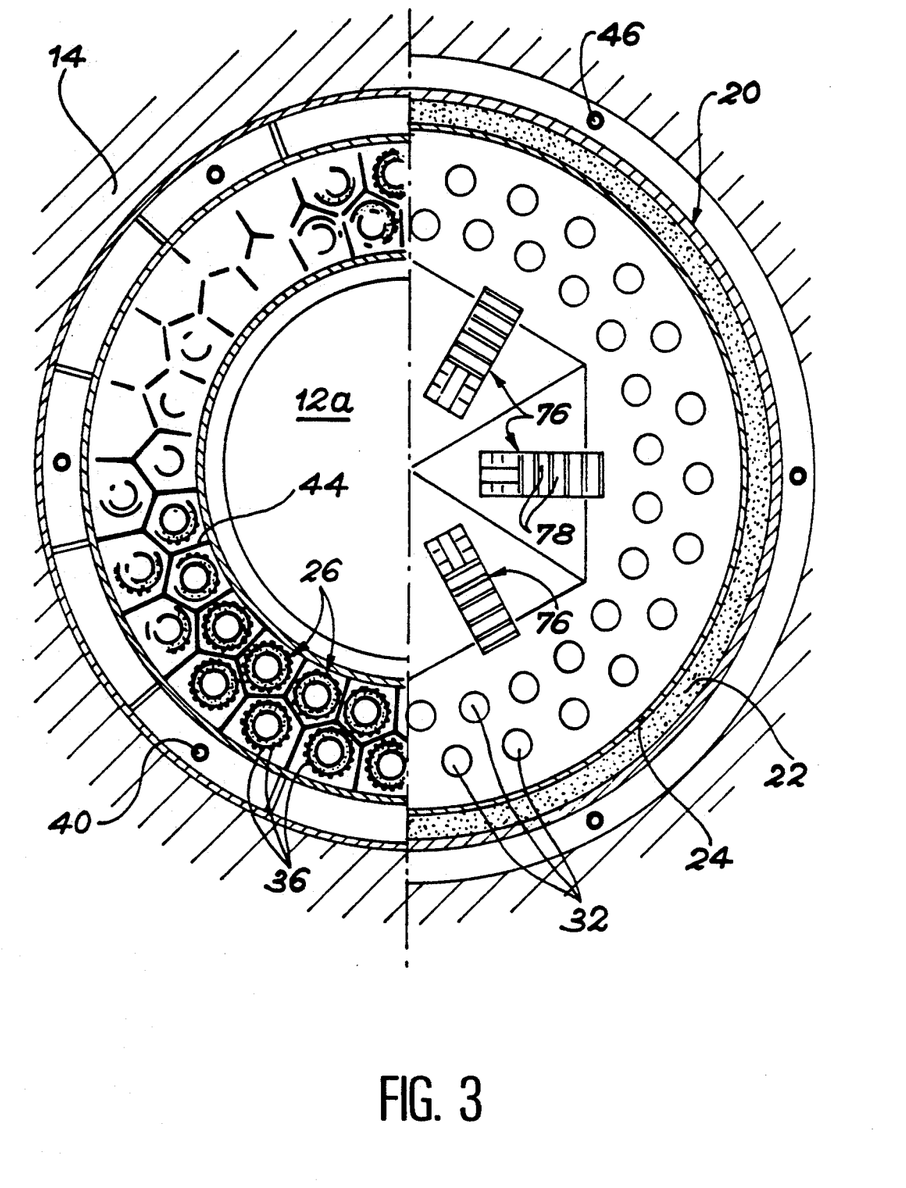
FIG. 3 A sectional view along line III—III of FIG. 2.

Besides the receptacle 20, the molten reactor core catching means comprise containers 26 arranged in the form of a ring below the planar, horizontal peripheral part of the receptacle 20. More specifically and as illustrated in FIGS. 2 and 3, the containers 26 are vertically axed containers, which are arranged in accordance with two concentric circles below the planar, horizontal peripheral part of the bottom of the receptacle 20 and whose wall is connected by its upper end to the wall of the receptacle 20. Obviously, the shape of the containers is not restricted to a cylindrical shape, as shown for illustration purposes in FIGS. 2 and 3. The containers 26 can have a random shape. As non-limitative examples, reference can be made to a cylindrical shape, an inverted cone shape and polygonal tubular shapes.

The total internal volume of the containers 26 is at least equal to the maximum volume of the corium, so that all the latter can be received in the containers in the case of a serious accident. The cross-section of the containers 26 is sufficiently large to prevent any premature, rapid gelling of the corium, which could prevent its penetration and filling of the containers. This is obtained by fixing the "equivalent" diameter, defined as being that of a circle of surface equal to that of the average cross-section of the containers, at a value exceeding 0.4 m. Moreover, in order to ensure an adequate exchange surface for the cooling of the total corium volume, the height of the containers 26 is at least equal to the aforementioned equivalent diameter.

Each of the containers 26 is sealed at its lower end by a cambered bottom and issues at its upper end into the receptacle 20, from which it is normally isolated by a meltable plug 32, as illustrated in FIG. 2. The meltable plugs 32 are made from a material having a melting point well below that of the sealing skin 24. When the corium penetrates the receptacle 20 following the meltdown of the reactor core, the meltable plugs rapidly melt in contact therewith, thus freeing the intake of the containers 26. Under normal reactor operating conditions, the function of these meltable plugs 32 is to prevent any water from entering the containers 26 and prevent any accidental dropping of an object to the bottom of the containers and the accumulation thereof at said location over a period of time.

Like the receptacle 20, each of the containers 26 is internally coated with several layers 28 of one or more materials which are refractory and chemically inert relative to corium.

As is diagrammatically shown in FIG. 1, the walls of the containers 26 are externally provided with heat exchange promoting means 36 such as blades, ribs or protuberances having a random shape.

In the embodiment illustrated in FIGS. 1 to 3, the central part 20a of the bottom of the receptacle 20 rests on a protuberance 12a of the raft foundation 12 by means of an assembly 38 of heat conducting elements, which can in particular be made from steel, graphite or a composite material of the carbon-carbon type. This assembly 38 of heat conducting elements adopts the conical or pyramidal shape of the adjacent part of the bottom of the receptacle 20. Moreover, it has a skirt-shaped, peripheral part 30a, which is extended downwards around the protuberance 12a. The function of said assembly 38 is to improve the heat conduction of the central part towards a cooling space 40 described hereinafter.

The means for catching the molten core also comprise a cooling space 40, which is generally annular in the first embodiment of the invention. This cooling space 40 is formed between the vessel well 14, the raft foundation 12, the protuberance 12a and the receptacle 20. More specifically, said space 40 has a main part located below the planar, horizontal, peripheral part of the bottom of the receptacle 20, in which are immersed the containers 26, and a narrower, upper part around the peripheral wall of the receptacle 20.

In the embodiment shown in FIG. 1, the containers 26 are supported by means of foot or leg-shaped supports 42, which rest directly on the raft foundation 12, in the bottom of the cooling space 40. Metal spacing grooves or gratings 44, whereof an example is shown in FIG. 3, are then placed within the cooling space 40 at different heights, in order to maintain a minimum spacing between said containers over the entire height thereof. As will be shown hereinafter, this minimum spacing ensures the passage of the water providing the cooling of the containers 26. The grids 44 are shaped in such a way as to favour the mixing and homogenization of the water circulating around the containers 26, thus increasing the action of the exchange promoters 36.

As is more specifically illustrated in FIG. 1, passive draining or emptying means are provided between the receptacle 20 and the cooling space 40. These passive emptying means have one or more overflows 46, whose end issues into the receptacle 20 below a level corresponding to the bottom of the reactor core 18. Each overflow 46 is installed in the narrow upper part of the cooling space 40 surrounding the peripheral wall of the receptacle 20. A thermomechanical shielded 48 protects the end of each overflow 46 issuing into the receptacle 20, so as to prevent any blockage of the overflows by the corium in the case of an accident.

The passive emptying means also comprise at least one siphon 50, whereof a first end is immersed in the bottom of the receptacle 20 and whereof the opposite end is immersed in the bottom of the cooling space 40. The upper, horizontal branch 50a of each of the overflows 50 is located substantially at the same level as the upper end of the overflow 46 issuing into the receptacle 20.

Moreover, at least one emptying pipe 52, equipped with a normally closed valve 54, issues into the bottom of the cooling space 40, so as to permit the emptying thereof, e.g. by pumping, when this proves necessary. Preferably, the valve 54 located in each of the emptying pipes 52 is a manually controlled valve, which can be manipulated under all conditions.

As is also illustrated in FIG. 1, the means for catching the molten core also comprise one or more tanks 56 storing the cooling water 58. The bottom of each of the tanks 56 is located at a level above that of the cooling space 40. Conversely, the level NO of the cooling water 58 in said tanks 56 is initially below that of the upper end of the overflows 46 issuing into the receptacle 20 and that of the upper branch 50a of each of the siphons 50.

Each of the storage tanks 56 communicates with the cooling space 40 by at least one supply pipe 60 connecting the bottom of the storage tank to the bottom of the cooling space. A normally closed isolating valve 62 is placed in each of the supply pipes 60 immediately below the tank 56. This isolating valve 62 is an electrovalve or an autonomous electrically controlled valve of an equivalent type, which can open automatically on receiving a signal detecting the start of reactor core meltdown. Such a detection signal can be supplied by one or more autonomous electrical supply systems placed in the vessel 16 or in the enclosure 10 of the reactor.

Each of the storage tanks 56 is also connected to the narrow upper part of the cooling space 40 by one or more water return pipes 64. As illustrated in FIG. 1, these pipes 64 are horizontal pipes, whose level is slightly above the level NO normally occupied by the cooling water 58 in the storage tanks 56.

The assembly constituted by the storage tanks 56, the cooling space 40 and the supply 60 and water return 64 pipes constitutes a passive cooling circuit. Thus, this circuit ensures a circulation of water 58 by natural convection between the space 40 and each of the tanks 56, when the valves 62 have been opened and the water contained in the cooling space 40 is heated by the presence of corium in the containers 26.

In the thus formed passive cooling circuit, the flow of cooling water 58 depends, among other variables, on the pressure difference existing between the bottom of the containers 26 and the upper level of the two-phase mixture of boiling water present in the cooling space 20. Under established natural circulation conditions, in a first approximation said pressure difference is also equal to the pressure exerted by a water column, at the temperature and pressure of the water of the tanks 56, with a height equal to the level difference between the surface of the water of the tanks 56 and the bottom of the containers 26. By giving said level difference a value of at least 5 m, it is possible to ensure an adequate flow to prevent any excessive temperature rise of the structures of the containers 26, or any excessive vapour accumulation in the cooling space 40, which would lead to a pressure rise in said space and would prevent the water contained in the reservoirs 56 from entering there, thus interrupting the flow of cooling water.

Taking account of the heating of the water resulting from the very high temperature of the corium contained in the containers 26, the water which enters the tanks 56 by the water return pipes 64 is in two phases. Part of the water vapour is entrained by the liquid and is recondensed in the water contained in the tanks 56. The remainder of the water vapour is discharged into the atmosphere defined by the confinement enclosure 10 through one or more openings 66 made in the top of the tanks 56, or above the level NO, by which each of the tanks is linked with said atmosphere. The condensation of the water vapour or steam entering the enclosure 10 is ensured by a certain number of heat sinks, which are normally present within the enclosure 10, such as cold surfaces 68. In order to speed up this condensation, it is also possible to place within the enclosure 10 heat exchangers 70, which serve as condensers. Use is preferably made of passive systems such as heat duct exchangers.

The water condensed in this way within the confinement enclosure 10 is collected above the tanks 56 and drained towards the latter by drainage pipes 72 immersed in the water 58. Moreover, the cooling of the water 58 in each of the tanks 56 can be ensured by heat exchangers 74 immersed in the water 58. Preferably use is made of passive, immersed heat exchangers 74, e.g. with heat ducts.

Obviously, the heat exchangers 70 and 74 can be replaced by any equivalent and preferably passive devices making it possible to remove from the confinement enclosure the power released during an accident.

The quantity of water 58 initially stored in the tanks 56 is determined in such a way as to ensure an operational autonomy of the passive cooling circuit for a transient phase during which the water resulting from the condensation of the steam within the confinement enclosure 10 has not yet been collected and drained towards the tanks 56. The total flow of recondensation water drained towards the tanks 56 by the drainage pipes 72 then supplies the cooling circuit in a continuous manner, without pumping out of the tanks 56 and without draining the natural circulation in the circuit, throughout the phases of the accident up to the long-term confinement of the thus recovered corium.

Finally, in order to prevent the overall device from being rendered inoperative by the dropping of a single block from the spherical bottom of the reactor vessel 16, as a result of the thermomechanical effects due to the accumulation at said point of a large mass of molten corium, fall damping or absorbing devices 76 are placed on the bottom of the receptacle 20 immediately below the vessel 16. As is more particularly illustrated in FIG. 3, these devices 76 are symmetrically distributed around the vertical axis of the vessel 2, so as to distribute the load over the bottom of the receptacle 20, in the case of a sudden drop from the bottom of the vessel 16 filled with molten corium.

Each of the damping devices 76 can be constituted by an assembly of tubes 78 (FIG. 2), which are progressively crushed under the load. Each assembly rests on a foundation slab 80 welded directly to the metal sealing skin 24 of the receptacle 20.

The operation of the molten core catcher means described hereinbefore relative to FIGS. 1 to 3 will now be explained with successive reference to FIGS. 4A to 4E.

With reference to FIGS. 1 and 2, brief information will be given on the state of the core catcher means when the reactor is functioning normally. The core 18 is then intact and the vessel 2 is filled with pressurized water, as is the primary circuit means.

The valves 62 of the water supply pipes 60 of the cooling space 40 are then closed and there is no water in the space 40 or in the receptacle 20. The valves 54 equipping the emptying pipes 52 are also closed. Moreover, the containers 26 are empty and sealed by watertight, meltable plugs 32.

Under normal reactor operating conditions, not shown passages give access to the interior of the receptacle 20 for the inspection of its state or for carrying out maintenance or repair operations to various devices located in the vessel 16 and the receptacle 20.

Figure 4:
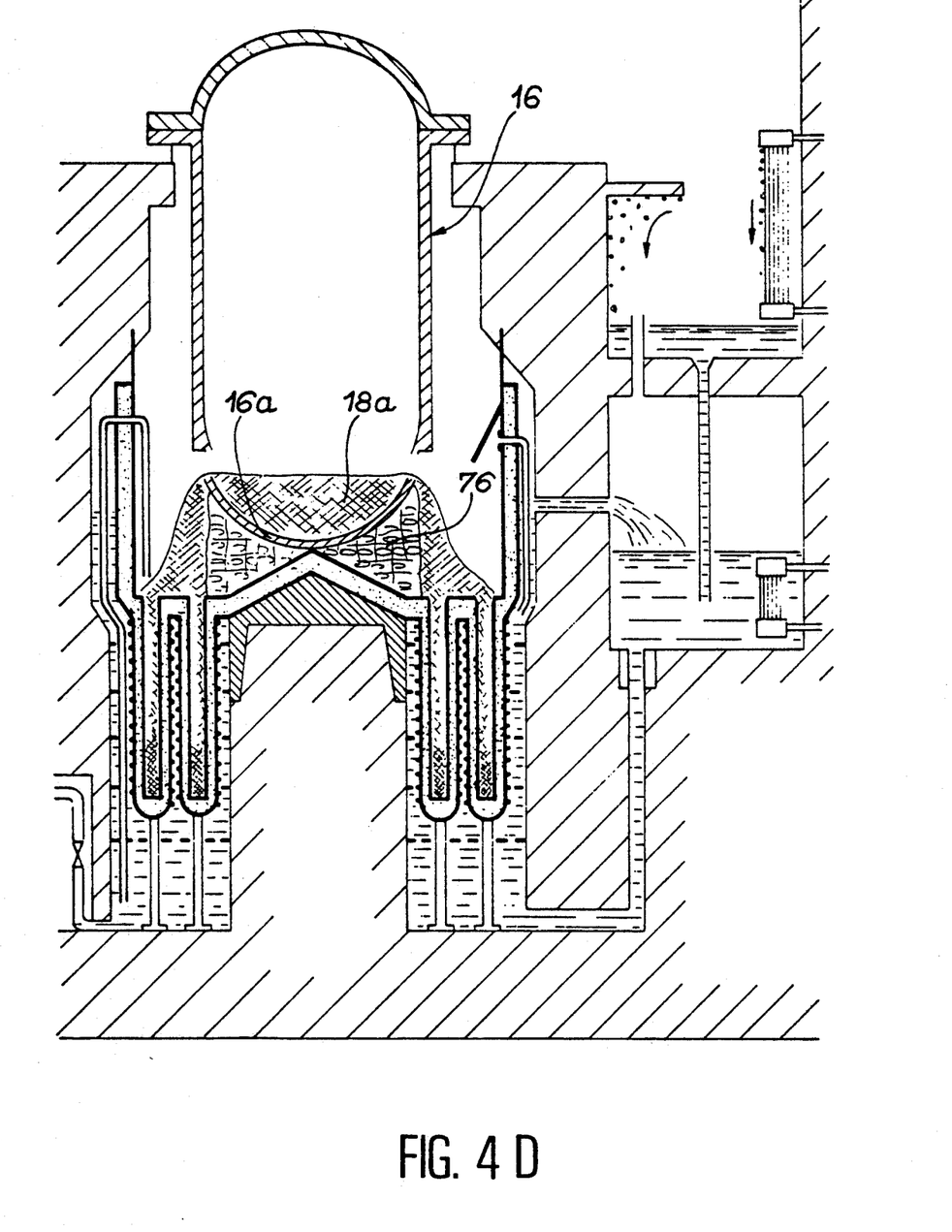
FIGS. 4A to 4E Views comparable to FIG. 1 illustrating the state of the reactor at different stages of the evolution of a serious accident caused by a primary coolant loss.
Figure 4A:
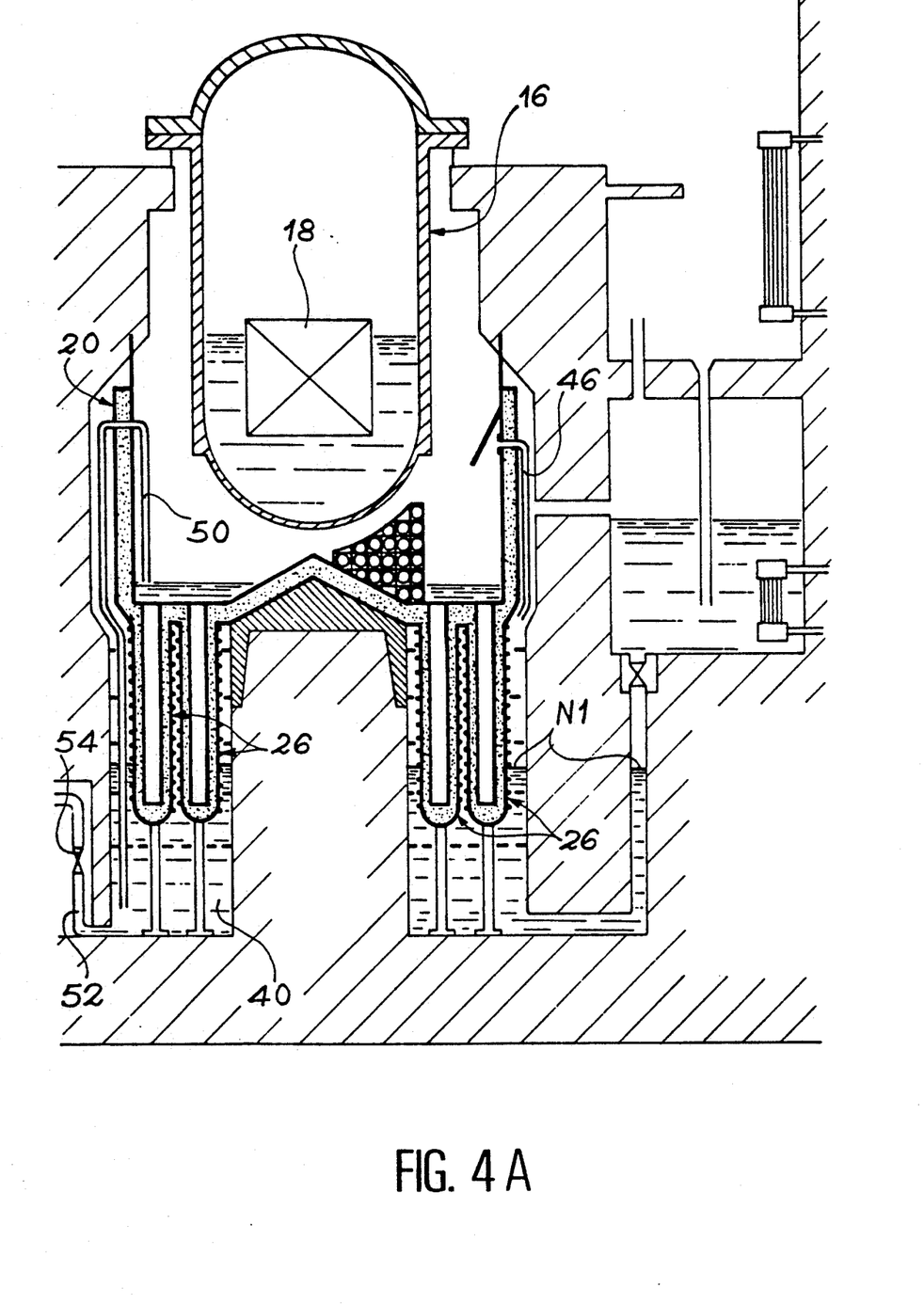

As illustrated by FIG. 4A, when a primary coolant loss accident liable to subsequently deteriorate into a serious accident with core meltdown occurs, the not shown, automatic depressurization system associated with the reactor primary circuit is automatically actuated, so as to lower the pressure in said circuit. Part of the water is then emptied from the vessel 16. However, the core 18 is still sufficiently cooled for the temperature in the nuclear fuel to stay below the melting point.

The effect of the depressurization of the primary circuit is to spread part of the water contained therein within the confinement enclosure 10. Part of the said water then enters the receptacle 20 and is then discharged into the cooling space 40, when it reaches the level determined by the overfills 46. The siphons 50 are automatically started up, so that all the water above the mouth of the siphon 50 immersed in the receptacle 20 is emptied into the cooling space 40. The water then reaches within the cooling space 40 a level N1, which is dependent on the water quantity collected in the receptacle 20. Simultaneously, that part of the water which has been spread throughout the enclosure outside the receptacle 20 is drained into the tanks 56, whose level rises. If the level exceeds that of the horizontal pipes 64, the water will also be discharged into the cooling space by said pipes and will increase the level N1.

In a certain number of cases, safeguarding means associated with the reactor will make it possible to cool its core 18 and therefore overcome the primary coolant loss accident without any other consequence. In this case, the restoration of the state of the reactor will involve a draining of the water accumulated in the cooling space 40. This operation is carried out by pumping the water through emptying pipes 52 after opening the isolating valves 54.

In the reverse hypothesis, where the safe-guarding means associated with the reactor do not make it possible to sufficiently cool the core 18 either because they are unavailable (loss of electric power), or because they are inadequate to ensure the immersion and cooling of the core, the latter starts to melt. An autonomous, standby electric power system then supplies a core meltdown detection signal, which is immediately transmitted to the valves 62 to control the opening thereof. This opening is automatically ensured by an autonomous electric power system.

Figure 4B:
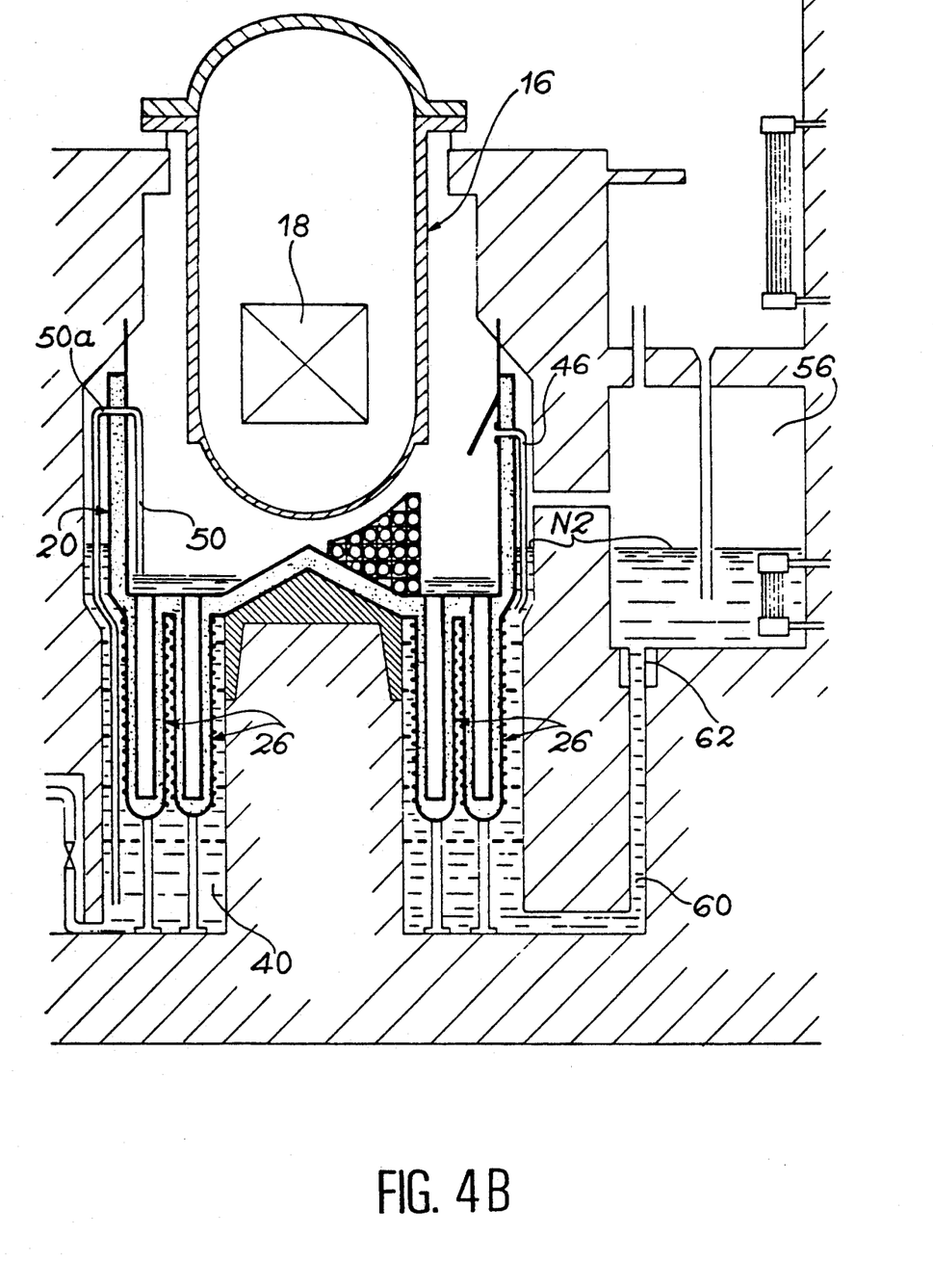

As illustrated in FIG. 4B, the water contained in the tanks 56 then penetrates by gravity the cooling space 40, passing through the supply pipes 60. The space 40 is then immersed up to a level N2 above that of the top of the containers 26.

The level N2 is on the one hand dependent on the sections, volumes and respective levels of the tanks 56 and the cooling space 40 and on the other on the total water volume available in the cooling circuit. Taking the total water volume available as being the sum of the initial water volume contained in the tanks 56 and the maximum water volume of the primary circuit which can be collected both in the cooling space 10 by emptying and in the tanks 56 by the draining of water following a total water loss of the primary circuit, it is possible to fix the equilibrium level N2 in such a way as to prevent the water from entering the receptacle 20. This result is achieved by giving the level N2 a value below that of the ends of the overflows 46 issuing into the receptacle 20 and the upper, horizontal branches 50a of the siphons 50. After emptying, the water in the receptacle 20 remains at the level corresponding to the mouth of the siphons 50.

The residual water quantity which could come into contact with the corium leaving the vessel 16 is consequently limited. Moreover, part of said water can evaporate under the effect of the heating of the bottom of the vessel 16 preceding the flow of corium out of the latter. In order to avoid an excessive overpressure, which could result from the evaporation of the residual water, use is made of not shown passages, which normally give access to the interior of the receptacle 20 in order to remove the vapour produced. Supplementary, not shown passages are provided for the case where the discharge capacity must be increased.

Figure 4C:
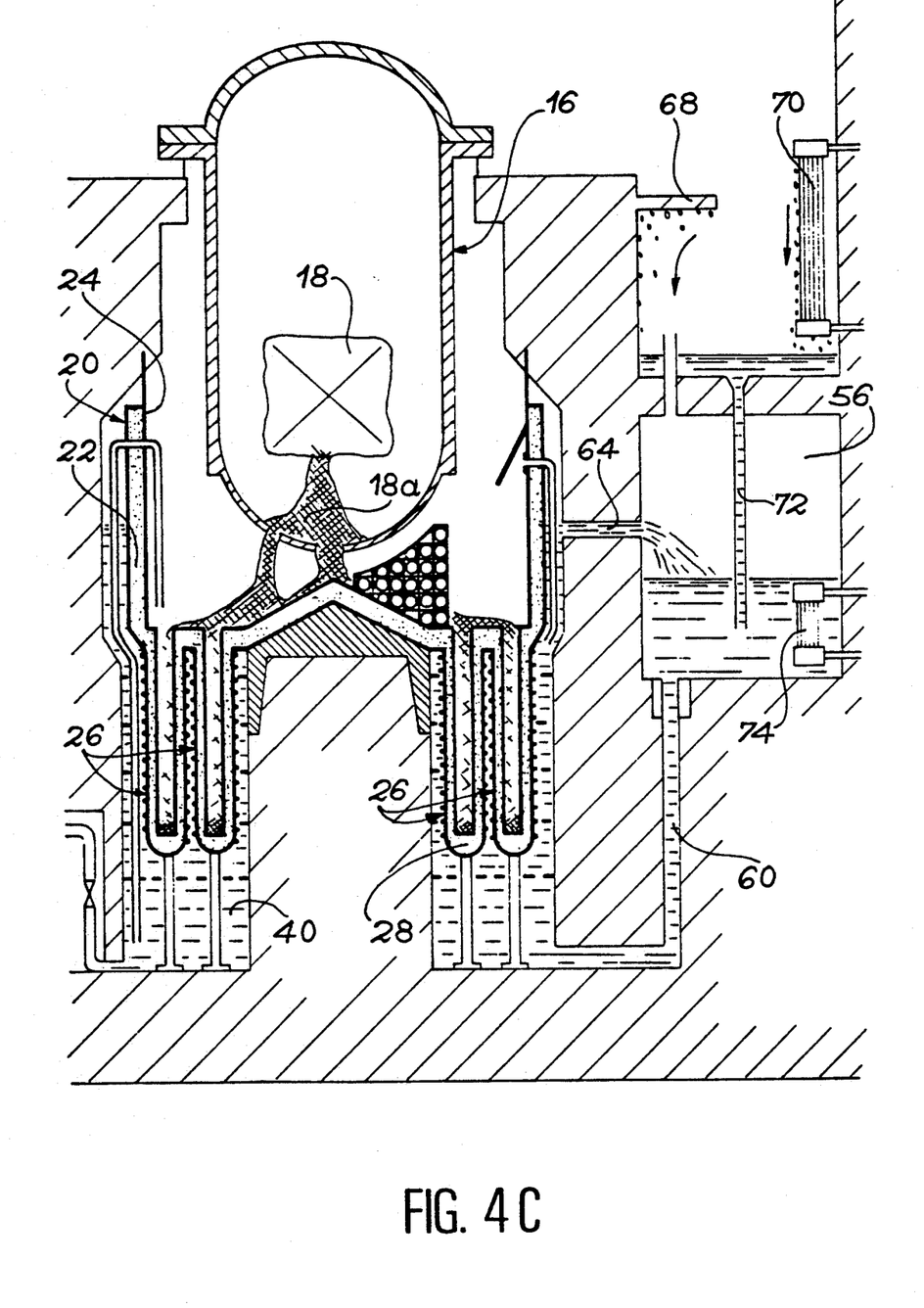

FIG. 4C illustrates the case where the corium 18a has perforated the bottom of the vessel 16 at several locations and said corium then flows into the receptacle 20. When the corium 18a comes into contact with the metal skin 24 internally protecting the receptacle 20, said skin is partly destroyed without producing any harmful effects, because the corium then comes into contact with the layers 22 made from a material which is refractory and chemically inert with respect to the corium. However, the meltable plugs 32 fulfill their function and the corium enters the containers 26, whose outer walls are heated.

Under the effect of the heating of the outer walls of the containers 26, the temperature of the water then contained in the cooling space 40 rises, leading to the starting of a natural water flow by thermosiphon between said space 40 and the tanks 56, via the pipes 60 and 64. The presence of heat exchange promoting means 36 on the outer walls of the containers 26 then make it possible to prevent the formation of a vapour film around these walls, which would have the effect of deteriorating the heat transfers to the cooling water.

When the natural circulation is established, the cooling water passes out in the two-phase state from the pipes 64 in the tanks 56. That part of the vapour produced, which is not immediately recondensed in the tanks 56 is dispersed within the confinement enclosure 10, where it is recondensed by the heat sinks constituted by the existing, cold wall 68 and possibly supplemented by the heat exchangers 70 or any equivalent means. The thus obtained condensation water is collected and brought into the tanks 56 by drainage pipes 72. The cooling of the water in the tanks 56, which maintains the natural circulation and consequently the cooling of the corium contained in the containers 26, is optionally supplemented by the exchangers 74.

FIG. 4D illustrates a comparable situation to that of FIG. 4C, in the case where the perforation of the bottom of the vessel 16 by the corium 18a has not taken place. The bottom 16a of the vessel 16 then drops as a block onto the damping or absorbing devices 76, with the corium which it contains. As a result of said damping devices, the constituent elements of the core catcher remain intact and the cooling efficiency is ensured in the same way as in the case of FIG. 4C.

Figure 4E:
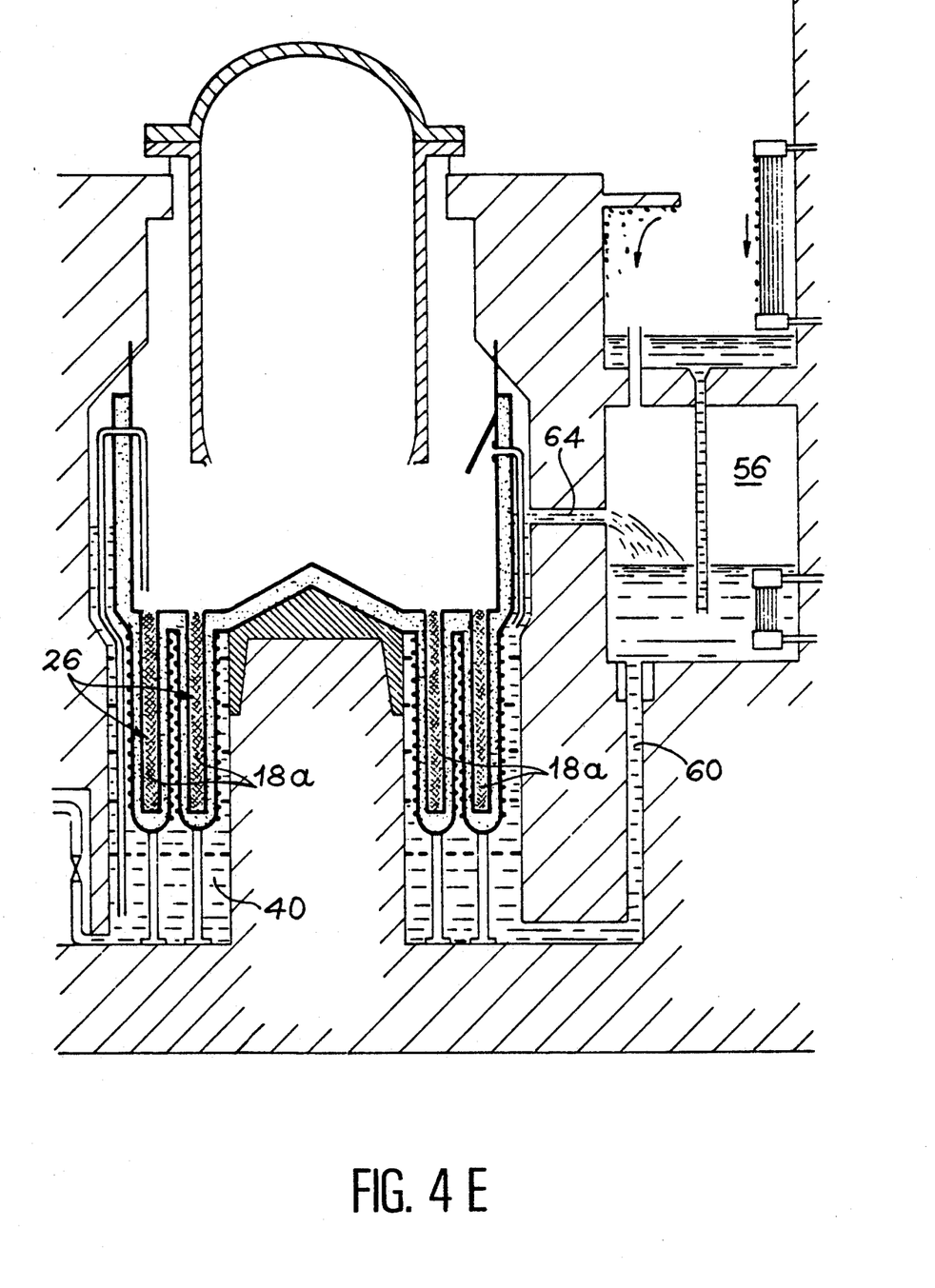

FIG. 4E illustrates the final state of the reactor, in which the corium 18a has been recovered and totally confined within the containers 26 and has undergone a long-term cooling by the passive cooling circuit comprising the cooling space 40, the tanks 56 and the pipes 60 and 64 connecting the same.

Figure 5:
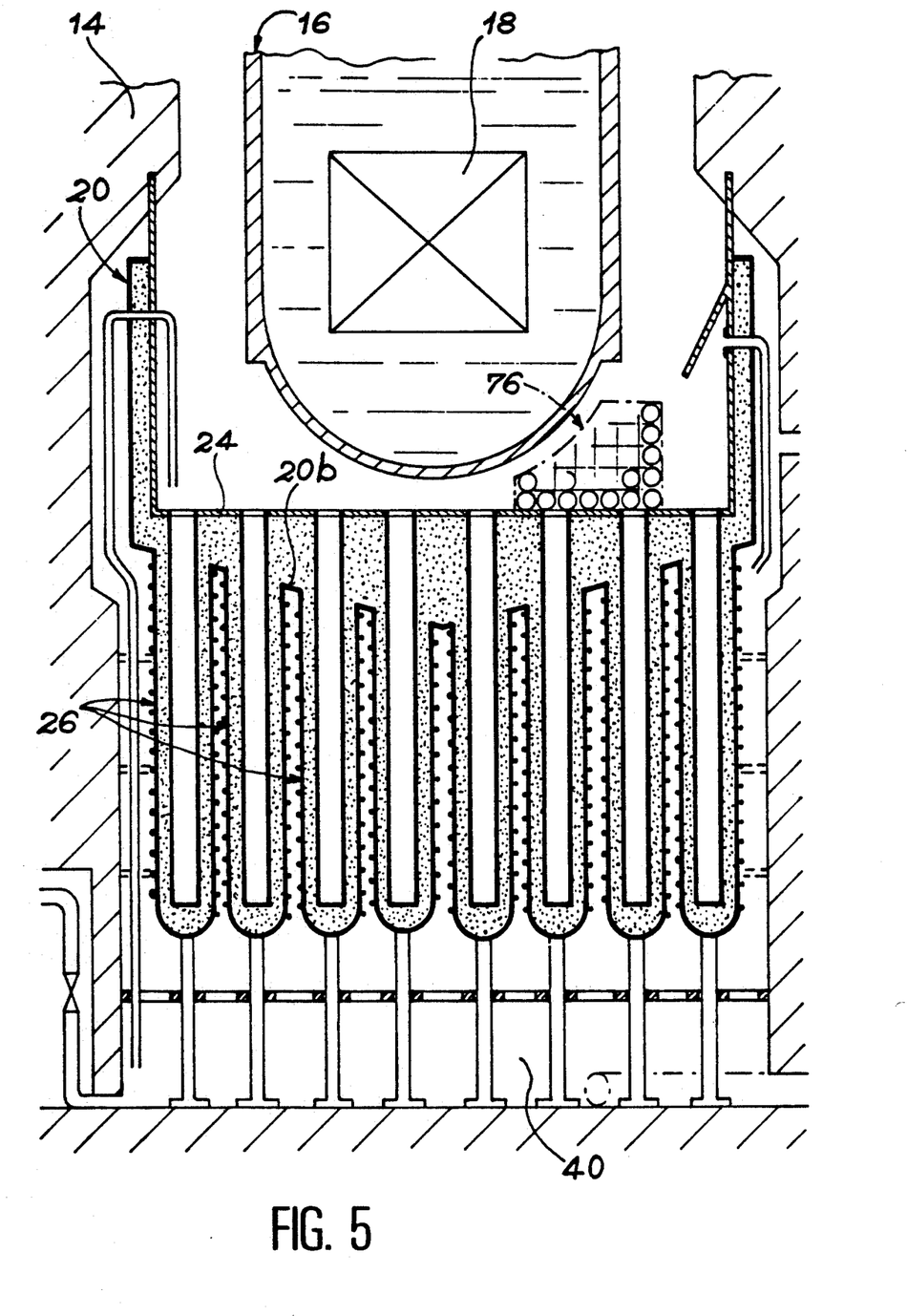
FIG. 5 A view comparable to FIG. 1 illustrating a second embodiment of the invention.

FIG. 5 shows a second embodiment of the invention and which differs from the first embodiment by the fact that instead of being distributed in ring-like manner around a protuberance 12a of the raft foundation 12, the containers 26 are distributed over the entire section of the bottom of the receptacle 20. For the same number of containers 26 and the same capacity of each of them, this embodiment makes it possible to either reduce the radial dimensions of the complete molten core catcher, so as to adapt it to the architecture of the vessel well 14, or increase the space between the containers 56, so as to facilitate cooling water flow. Obviously, these two advantages can be combined.

The bottom 20b of the container 20 is then shaped like an inverted cone, which enables the vapour bubbles produced by the boiling of the water in the space 40 to migrate from the centre towards the outside. This bottom 20b is constituted by a metal formwork, in which has been cast anhydrous, refractory concrete. The formation of a vapour pocket below this bottom, which would lead to a local drying out of the latter, is consequently prevented. Moreover, the metal sealing skin 24 forming an inner covering for the receptacle 20 has a planar, horizontal bottom.

In order to facilitate the cooling of the containers 56 located in the centre, advantageously supply pipes 60 issue as close as possible to the central part of the space 40.

The other characteristics of the core catcher and the operation thereof are identical to those in the first embodiment.

Figure 6:
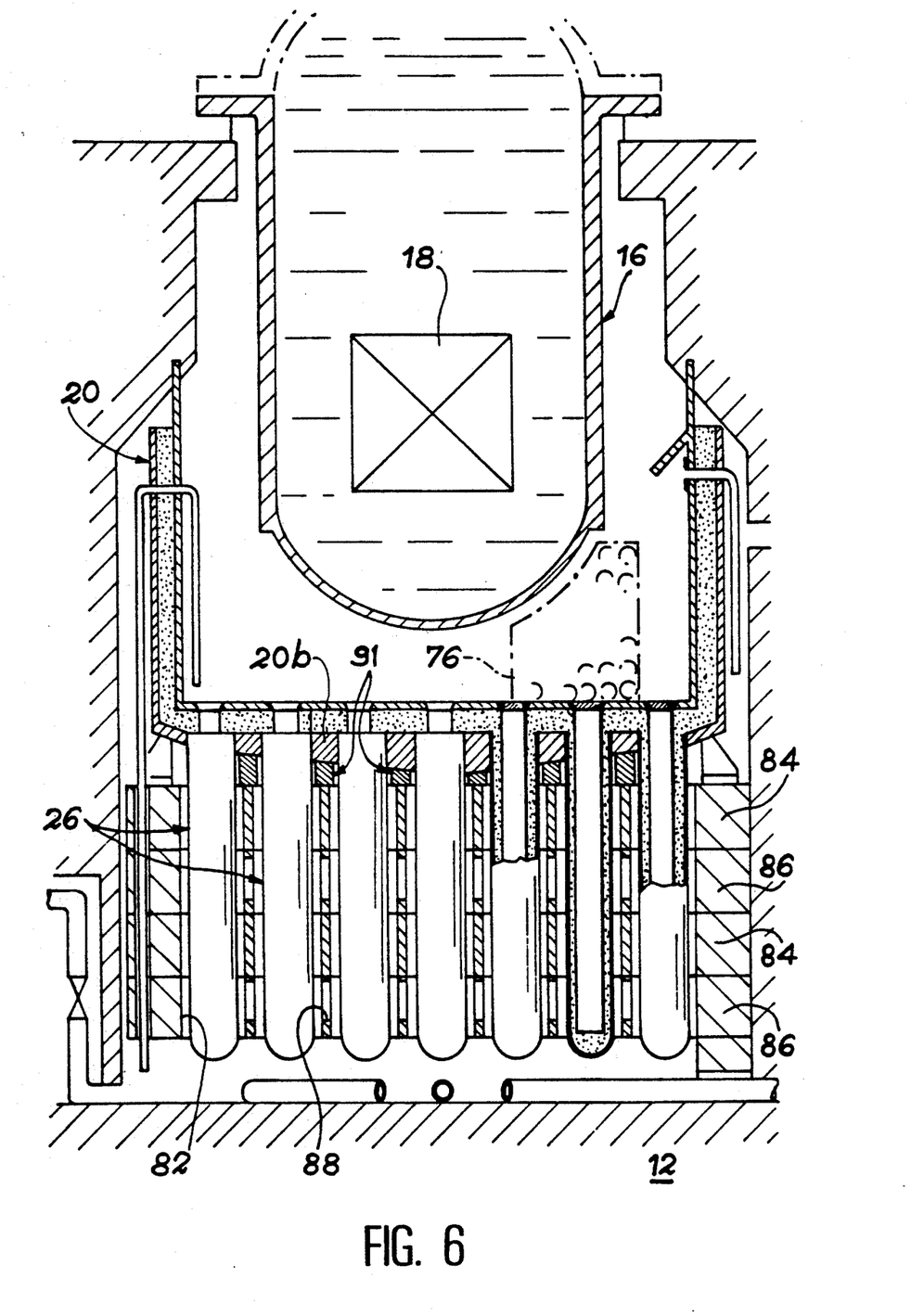
FIG. 6 A view comparable to FIGS. 1 and 5 illustrating a third embodiment of the invention.

FIG. 6 shows a third embodiment of the invention, which essentially differs from the second embodiment described relative to FIG. 5 by the fact that instead of being directly supported by supports resting on the raft foundation 12, the containers 26 are directly suspended on the bottom 20b of the receptacle 20.

In order that it can support the weight of the containers 26 when the latter are filled with corium, the bottom 20b of the receptacle 20 is then made thicker. This bottom can in particular be formed by a metal formwork in which has been cast anhydrous, refractory concrete.

In this third embodiment of the invention, the containers 26 are located in vertical cavities 82 formed in an assembly constituted by concrete slabs 84, 86 stacked in alternating manner and resting on the foundation 12. The slabs 84 are perforated by holes at locations corresponding to the cavities 80. The slabs 86 have the same holes and passages 88 by which the cavities 82 are linked with one another. These passages 88 permit transverse water flows and thus improve the cooling action. The insertion of containers 26 into the cavities 82 makes it possible to eliminate the grids 44.

Angle pieces 90 and studs 91 are fixed to the upper part of this assembly to directly support the bottom 20b of the receptacle 20.

In this third embodiment of the invention, the other characteristics of the molten core catcher and its operation are identical to those of the first embodiment described in detail hereinbefore.

Obviously, the invention is not limited to the embodiment described in exemplified manner hereinbefore and covers all variants thereof. Thus, although these three embodiments relate to a pressurized water nuclear reactor, the core catcher according to the invention can also be used in a boiling water reactor.

We claim:

1. Nuclear reactor having a confinement enclosure, a primary circuit totally enclosed within said enclosure and containing pressurized water, said primary circuit having a vessel in which is located a core, and means for the recovery of the core in the case of its meltdown, wherein the core recovery means comprise a receptacle surrounding at least a lower part of the vessel, containers located below the receptacle and separated from the latter by meltable plugs, a cooling space surrounding the containers, means for the passive emptying of the receptacle into the cooling space, at least one cooling water storage tank located at a level above that of the cooling space and means for establishing a natural convection flow between the tank and the cooling space.

2. Nuclear reactor according to claim 1, wherein fall damping means are located in the receptacle below the vessel.

3. Nuclear reactor according to claim 1, wherein the receptacle is internally covered by at least one layer of a material, which is refractory and chemically inert with respect to the materials forming the molten core and covered by a sealing skin.

4. Nuclear reactor according to claim 1, wherein the containers are internally coated with at least one layer of a material, which is refractory and chemically inert with respect to the materials forming the molten core.

5. Nuclear reactor according to claim 1, wherein the containers are externally provided with heat exchange promoting means.

6. Nuclear reactor according to claim 1, wherein the height of the containers is at least equal to the equivalent diameter of their average cross-section, defined as the diameter of a circle of surface equal to that of the average cross-section of the container.

7. Nuclear reactor according to claim 1, wherein the passive emptying means comprise at least one overflow and at least one siphon.

8. Nuclear reactor according to claim 7, wherein the end of the overflow issuing into the receptacle is protected by a thermomechanical shield.

9. Nuclear reactor according to claim 7, wherein the end of the overflow issuing into the receptacle and an upper branch of the siphon are located at levels above the level of the cooling water in the storage tank.

10. Nuclear reactor according to claim 1, wherein the means for establishing a natural convection flow comprise at least one supply pipe connecting the bottom of the storage tank to the bottom of the cooling space, a normally closed isolating means located in said supply pipe, and at least one water return pipe connecting the cooling space to the storage tank, at a level above the entrance level of the containers.

11. Nuclear reactor according to claim 10, wherein means are provided for detecting the melting of the core, which can emit a signal for controlling the automatic opening of the isolating means.

12. Nuclear reactor according to claim 1, wherein each tank issues into the confinement enclosure by at least one opening formed above the level of the cooling water in said tank.

13. Nuclear reactor according to claim 1, wherein cooling water cooling means are located in the confinement enclosure.

14. Nuclear reactor according to claim 13, wherein the cooling means comprise water vapour condensation means placed above each tank.

15. Nuclear reactor according to claim 14, wherein the confinement enclosure issues into each tank by at least one condensation water draining pipe.

16. Nuclear reactor according to claim 13, wherein the cooling means comprise heat evacuation means placed in each tank.

17. Nuclear reactor according to claim 1, wherein at least one emptying pipe, equipped with a normally closed isolating means issues into the bottom of the cooling space.

18. Nuclear reactor according to claim 1, wherein the containers have a total internal volume at least equal to the volume of the corium resulting from the total meltdown of the core.

19. Nuclear reactor according to claim 1, wherein the containers rest on the bottom of the confinement space by supports and are maintained laterally within the said space by spacing grids.

20. Nuclear reactor according to claim 19, wherein the receptacle has a bottom provided with a central part inclined radially towards the outside and located beneath the reactor vessel, the containers being arranged in ring-like manner below a peripheral part of the bottom of the receptacle surrounding said central part.

21. Nuclear reactor according to claim 20, wherein a thermally conductive material is located below the central part of the bottom of the receptacle and is extended into a peripheral zone adjacent to an upper part of the cooling space.

22. Nuclear reactor according to claim 18, wherein the receptacle has an inverted cone-shaped bottom below which are regularly distributed the containers.

23. Nuclear reactor according to claim 22, wherein the inverted cone-shaped receptacle bottom is constituted by a metal formwork, in which has been cast anhydrous, refractory concrete.

24. Nuclear reactor according to claim 1, wherein the containers are suspended on the receptacle bottom.

25. Nuclear reactor according to claim 24, wherein the containers are located in cavities formed in a structure placed in the cooling space and in which are provided passages between the cavities.

26. Nuclear reactor according to claim 25, wherein said structure comprises a stack of concrete slabs of two different types arranged in alternating manner, said passages being formed in one of the slab types, whereas all the slabs have holes forming said cavities.

27. Nuclear reactor according to claim 25, wherein said structure is provided with bearing parts, fixed to its upper surface, with a view to supporting the receptacle bottom.

* * * * *